US012101863B2

(12) United States Patent
Bleloch et al.

(10) Patent No.: US 12,101,863 B2
(45) Date of Patent: Sep. 24, 2024

(54) DEVICES, SYSTEMS, AND METHODS FOR SENSING TEMPERATURE IN INDUCTION HEATING SYSTEMS

(71) Applicant: Philip Morris Products S.A., Neuchâtel (CH)

(72) Inventors: Andrew L. Bleloch, Kenmore, WA (US); Neeraj S. Bhardwaj, Belmont, CA (US); Matthew Greenfield, Scotts Valley, CA (US); Peter Nysen, San Jose, CA (US)

(73) Assignee: Philip Morris Products S.A., Neuchâtel (CH)

( * ) Notice: Subject to any disclaimer, the term of this patent is extended or adjusted under 35 U.S.C. 154(b) by 0 days.

(21) Appl. No.: 18/169,311

(22) Filed: Feb. 15, 2023

(65) Prior Publication Data
US 2023/0199918 A1  Jun. 22, 2023

Related U.S. Application Data

(63) Continuation of application No. 16/605,289, filed as application No. PCT/US2018/028407 on Apr. 19, 2018, now Pat. No. 11,700,674.
(Continued)

(51) Int. Cl.
*A24F 13/00* (2006.01)
*A24F 40/465* (2020.01)
(Continued)

(52) U.S. Cl.
CPC ............. *H05B 6/06* (2013.01); *A24F 40/465* (2020.01); *A24F 40/51* (2020.01); *A24F 40/65* (2020.01);
(Continued)

(58) Field of Classification Search
CPC .................................................... A24F 47/00
(Continued)

(56) References Cited

U.S. PATENT DOCUMENTS

| 4,025,912 A | 5/1977 | Rice |
| 11,647,793 B2 * | 5/2023 | Lord ...................... A24F 40/51 131/328 |

(Continued)

FOREIGN PATENT DOCUMENTS

| CN | 102103021 A | 6/2011 |
| CN | 102435774 A | 5/2012 |

(Continued)

OTHER PUBLICATIONS

Chinese Office Action issued on Apr. 29, 2023 in Chinese Patent Application No. 201880034702.8 (with English translation), 8 pages.
(Continued)

*Primary Examiner* — Phuong K Dinh
(74) *Attorney, Agent, or Firm* — Oblon, McClelland, Maier & Neustadt, L.L.P.

(57) ABSTRACT

A system for sensing temperature in a vaporizer device is provided, the system including: an induction element; a susceptor element; and a temperature sensor circuit in thermal contact with the susceptor element, the temperature sensor circuit including a capacitor and an inductor, a resonant frequency of the temperature sensor circuit changes based on a temperature of the susceptor element, the induction element is electromagnetically coupled to the temperature sensor, the induction element includes an induction heating element configured to create a first magnetic field around the susceptor element, and the susceptor element generates heat based on the first magnetic field.

15 Claims, 9 Drawing Sheets

Related U.S. Application Data

(60) Provisional application No. 62/486,212, filed on Apr. 17, 2017.

(51) Int. Cl.
*A24F 40/51* (2020.01)
*A24F 40/65* (2020.01)
*G01K 1/024* (2021.01)
*G01K 7/32* (2006.01)
*G01K 7/34* (2006.01)
*H02J 50/12* (2016.01)
*H05B 6/06* (2006.01)
*A24F 40/10* (2020.01)

(52) U.S. Cl.
CPC .............. *G01K 1/024* (2013.01); *G01K 7/32* (2013.01); *G01K 7/34* (2013.01); *H02J 50/12* (2016.02); *A24F 40/10* (2020.01)

(58) Field of Classification Search
USPC .................................................. 131/328–329
See application file for complete search history.

(56) References Cited

U.S. PATENT DOCUMENTS

| | | | |
|---|---|---|---|
| 11,700,674 B2 * | 7/2023 | Bleloch | A24F 40/465 307/104 |
| 2007/0087465 A1 | 4/2007 | Stahl et al. | |
| 2009/0188396 A1 | 7/2009 | Hofmann et al. | |
| 2012/0128030 A1 | 5/2012 | Suess et al. | |
| 2016/0088685 A1 | 3/2016 | Henke et al. | |
| 2016/0234886 A1 | 8/2016 | Laghi et al. | |
| 2017/0055583 A1 | 3/2017 | Blandino et al. | |
| 2018/0192700 A1 * | 7/2018 | Fraser | A24F 40/42 |
| 2018/0297832 A1 | 10/2018 | Fabbri | |
| 2018/0329015 A1 | 11/2018 | Loussert | |
| 2020/0022412 A1 | 1/2020 | Abi Aoun | |

FOREIGN PATENT DOCUMENTS

| | | |
|---|---|---|
| CN | 102980677 A | 3/2013 |
| CN | 105890789 A | 8/2016 |
| CN | 105938021 A | 9/2016 |
| EP | 2330866 A2 | 11/2016 |
| JP | 2002195890 A | 7/2002 |
| JP | 2004144683 A | 5/2004 |
| JP | 2016524777 A | 8/2016 |
| WO | WO 2016065574 A1 | 5/2016 |

OTHER PUBLICATIONS

Japanese Decision to Grant issued Oct. 5, 2023 in Japanese Patent Application No. 2019-557410 (with English Translation), 4 pages.
Office Action mailed on May 11, 2022 in Chinese Patent Application 201880034702.8 filed on Apr. 19, 2018, (with English Translation, total 13 pages).
United States Office Action issued May 18, 2022 in United States U.S. Appl. No. 16/605,289, 15 pages.
Japanese Office Action mailed on Apr. 25, 2024, issued in Japanese Patent Application No. 2023-028373, with computer-generated machine translation, total 5 pages.

* cited by examiner

DEVICES, SYSTEMS, AND METHODS FOR SENSING TEMPERATURE IN INDUCTION HEATING SYSTEMS

CROSS-REFERENCE TO RELATED APPLICATIONS

This application is a continuation of and claims benefit under 35 U.S.C. § 120 to U.S. application Ser. No. 16/605,289, filed Oct. 15, 2019, which is a U.S. National Stage application of PCT/US2018/028407, filed Apr. 19, 2018, which is based upon and claims benefit under 35 U.S.C. § 119(e) to U.S. Provisional Application No. 62/486,212, filed Apr. 17, 2017, the entire contents of each of which are incorporated herein by reference.

BACKGROUND OF THE INVENTION

1. Field of the Invention

This invention relates generally to systems, devices, products, apparatus, and methods that are used for sensing temperature in an induction heating system, and in one particular embodiment to a device, system, and method for sensing temperature in an induction heating system of a vaporizer device.

2. Technical Considerations

Induction heating includes heating an object that is electrically conductive (e.g., a metal object) by electromagnetic induction. For example, induction heating may include heating the object based on heat generated in the object by eddy currents that flow in the object. In some instances, an induction heating system may include an induction heating element and an electrically conductive object to be heated based on electromagnetic induction. The induction heating element may include an electromagnet and an electronic oscillator that passes an alternating current (AC) through the electromagnet so that the electromagnet may produce a magnetic field. The magnetic field may be directed at the electrically conductive object and the magnetic field may penetrate the electrically conductive object. Electric currents may be generated inside the electrically conductive object based on the magnetic field. The electric currents may be referred to as eddy currents. The eddy currents may flow through the electrically conductive object and cause heat to be generated in the electrically conductive object based on Joule heating. In some instances, the electrically conductive object may include a ferromagnetic material (e.g., iron) and heat may be generated in the electrically conductive object based on magnetic hysteresis (e.g., magnetic hysteresis losses).

In some instances, the electrically conductive object may include a susceptor. The susceptor may be a material that has the ability to absorb electromagnetic energy and convert the electromagnetic energy to heat. In some examples, the susceptor may be designed to emit the heat as radiation (e.g., infrared thermal radiation). The electromagnetic energy may include radiation (e.g., electromagnetic radiation) in the radio frequency spectrum or microwave spectrum.

SUMMARY OF THE INVENTION

Devices, systems, products, apparatus, and/or methods for sensing temperature in an induction heating system are disclosed that overcome some or all of the deficiencies of the prior art.

Further embodiments or aspects are set forth in the following numbered clauses:

Clause 1: A system for sensing temperature in a vaporizer device comprising: an induction element; a susceptor element; and a temperature sensor circuit in thermal contact with the susceptor element, the temperature sensor circuit comprising a capacitor having a capacitance value equal to C; an inductor around the capacitor, the inductor having an inductance value equal to L; wherein a resonant frequency of the temperature sensor circuit changes based on a temperature of the susceptor element; and wherein the induction element is electromagnetically coupled to the temperature sensor; wherein the resonant frequency of the temperature sensor circuit is equal to: $1/2\pi\sqrt{LC}$.

Clause 2: The system of clause 1, further comprising: a radio frequency identification (RFID) device electrically connected to the temperature sensor circuit.

Clause 3: The system of clauses 1 or 2, wherein the RFID device comprises an RFID microchip electrically connected to the inductor of the temperature sensor circuit.

Clause 4: The system of any of clauses 1-3, wherein the temperature sensor circuit is encapsulated within a structure.

Clause 5: The system of any of clauses 1-4 wherein the capacitor of the temperature sensor circuit is in thermal contact with the susceptor element.

Clause 6: The system of any of clauses 1-5, wherein the temperature sensor circuit is encapsulated within a structure.

Clause 7: The system of any of clauses 1-6, wherein the structure is a glass structure.

Clause 8: The system of any of clauses 1-7, wherein the induction element comprises an induction heating element configured to create a magnetic field around the susceptor element, and wherein the susceptor element generates heat based on the magnetic field.

Clause 9: The system of any of clauses 1-8, further comprising a cartridge, and wherein the susceptor element is located within the cartridge and the temperature sensor circuit is located within the cartridge.

Clause 10: The system of any of clauses 1-9, further comprising an RFID device electrically connected to the temperature sensor circuit, and wherein the RFID device is located within the cartridge.

Clause 11: The system of any of clauses 1-10, further comprising an induction heating element configured to create a magnetic field around the susceptor element, and wherein the susceptor element generates heat based on the magnetic field.

Clause 12: A system for sensing temperature in a vaporizer device comprising: an induction element; a susceptor element; and a temperature sensor circuit in thermal contact with the susceptor element, the temperature sensor circuit comprising: a capacitor; an inductor adjacent the capacitor, the inductor being electromagnetically coupled to the capacitor; wherein a resonant frequency of the temperature sensor circuit changes based on a temperature of the susceptor element; and wherein the induction element is electromagnetically coupled to the temperature sensor.

Clause 13: The system of clause 12, wherein the capacitor has a capacitance value equal to C, wherein the inductor has an inductance value equal to L, and wherein the resonant frequency of the temperature sensor circuit is equal to: $1/2\pi\sqrt{LC}$.

Clause 14: The system of clauses 12 or 13, further comprising: a radio frequency identification (RFID) device electrically connected to the temperature sensor circuit.

Clause 15: The system of clauses 12-14, wherein the RFID device comprises an RFID microchip electrically connected to the inductor of the temperature sensor circuit.

Clause 16: The system of any of clauses 12-15, wherein the temperature sensor circuit is encapsulated within a structure.

Clause 17: The system of any of clauses 12-16, wherein the capacitor of the temperature sensor circuit is in thermal contact with the susceptor element.

Clause 18: The system of any of clauses 12-17, wherein the temperature sensor circuit is encapsulated within a structure.

Clause 19: The system of any of clauses 12-18, wherein the structure is a glass structure.

Clause 20: The system of any of clauses 12-19, wherein the induction element comprises an induction heating element configured to create a magnetic field around the susceptor element, and wherein the susceptor element generates heat based on the magnetic field.

Clause 21: The system of any of clauses 12-20, further comprising a cartridge, and wherein the susceptor element is located within the cartridge and the temperature sensor circuit is located within the cartridge.

Clause 22: The system of any of clauses 12-21, further comprising an RFID device electrically connected to the temperature sensor circuit, and wherein the RFID device is located within the cartridge.

Clause 23: The system of any of clauses 12-22, further comprising an induction heating element configured to create a magnetic field around the susceptor element, and wherein the susceptor element generates heat based on the magnetic field.

Clause 24: A system for sensing temperature in a vaporizer device comprising: a susceptor element; and a temperature sensor circuit in contact with the susceptor element, the temperature sensor circuit comprising: a capacitor; and an induction coil adjacent the capacitor; at least one processor interconnected with the temperature sensor; wherein the at least one processor is configured to: determine a temperature of the susceptor element based on a resonant frequency of the temperature sensor circuit.

Clause 25: The system of clause 24, wherein the capacitor has a capacitance value equal to C, wherein the inductor has an inductance value equal to L, and wherein the resonant frequency of the temperature sensor circuit is equal to: $1/2\pi \sqrt{LC}$.

Clause 26: The system of clauses 24 or 25, further comprising: a radio frequency identification (RFID) device electrically connected to the temperature sensor circuit.

Clause 27: The system of any of clauses 24-26, wherein the RFID device comprises an RFID microchip electrically connected to the inductor of the temperature sensor circuit.

Clause 28: The system of any of clauses 24-27, wherein the temperature sensor circuit is encapsulated within a structure.

Clause 29: The system of any of clauses 24-28, wherein the capacitor of the temperature sensor circuit is in thermal contact with the susceptor element.

Clause 30: The system of any of clauses 24-29, wherein the temperature sensor circuit is encapsulated within a structure.

Clause 31: The system of any of clauses 24-30, wherein the structure is a glass structure.

Clause 32: The system of any of clauses 24-31, wherein the induction element comprises an induction heating element configured to create a magnetic field around the susceptor element, and wherein the susceptor element generates heat based on the magnetic field.

Clause 33: The system of any of clauses 24-32, further comprising a cartridge, and wherein the susceptor element is located within the cartridge and the temperature sensor circuit is located within the cartridge.

Clause 34: The system of any of clauses 24-33, further comprising an RFID device electrically connected to the temperature sensor circuit, and wherein the RFID device is located within the cartridge.

Clause 35: The system of any of clauses 24-34, further comprising an induction heating element configured to create a magnetic field around the susceptor element, and wherein the susceptor element generates heat based on the magnetic field.

Clause 36: A method for sensing temperature in a vaporizer device comprising: heating a susceptor element based on an electrical current induced in the susceptor element, determining a resonant frequency of a temperature sensor circuit associated with the susceptor element based on heating the susceptor element, and determining a temperature of the susceptor element based on the resonant frequency of the temperature sensor circuit.

Clause 37: The method of clause 36, wherein the capacitor has a capacitance value equal to C, wherein the inductor has an inductance value equal to L, and wherein the resonant frequency of the temperature sensor circuit is equal to: $1/2\pi \sqrt{LC}$.

Clause 38: The method of clauses 36 or 37, wherein a radio frequency identification (RFID) device is electrically connected to the temperature sensor circuit, and the method further comprising: receiving information associated with the susceptor element from the RFID device.

Clause 39: The method of clauses 36-38, wherein the RFID device comprises an RFID microchip electrically connected to the inductor of the temperature sensor circuit.

Clause 40: The method of any of clauses 36-39, wherein the temperature sensor circuit is encapsulated within a structure.

Clause 41: The method of any of clauses 36-40, wherein the capacitor of the temperature sensor circuit is in thermal contact with the susceptor element.

Clause 42: The method of any of clauses 36-41, wherein the temperature sensor circuit is encapsulated within a structure.

Clause 43: The method of any of clauses 36-42, wherein the structure is a glass structure.

Clause 44: The method of any of clauses 36-43, wherein the induction element comprises an induction heating element configured to create a magnetic field around the susceptor element, and wherein the susceptor element generates heat based on the magnetic field.

Clause 45: The method of any of clauses 36-44, further comprising a cartridge, and wherein the susceptor element is located within the cartridge and the temperature sensor circuit is located within the cartridge.

Clause 46: The method of any of clauses 36-45, further comprising an RFID device electrically connected to the temperature sensor circuit, and wherein the RFID device is located within the cartridge.

Clause 47: The method of any of clauses 36-46, further comprising an induction heating element configured to create a magnetic field around the susceptor element, and wherein the susceptor element generates heat based on the magnetic field.

Clause 48: A method for sensing temperature in an induction heating system, comprising: heating a susceptor element based on an electrical current induced in the susceptor element; determining a resonant frequency of a temperature sensor circuit associated with the susceptor element based on heating the susceptor element; and determining a temperature of the susceptor element based on the resonant frequency of the temperature sensor circuit.

Clause 49: The method of clause 48, wherein heating the susceptor element comprises providing, with an induction heating element, a magnetic field to the susceptor element, wherein the magnetic field induces the electrical current in the susceptor element.

Clause 50: The method of clauses 48 or 49, wherein the induction heating element comprises an induction coil, and wherein providing the magnetic field comprises providing a second electrical current from a power source to the induction heating element.

Clause 51: The method of any of clauses 48-50, wherein determining the resonant frequency of the temperature sensor circuit comprises determining the resonant frequency based on the inductance and capacitance of the temperature sensor.

Clause 52: The method of any of clauses 48-51, wherein heating the susceptor element comprises providing a first magnetic field to the susceptor, and wherein determining the resonant frequency of the temperature sensor circuit comprises: receiving, from an inductor of the temperature sensor circuit, a second magnetic field; and determining the resonant frequency of the temperature sensor circuit based on the second magnetic field.

Clause 53: The method of any of clauses 48-52, wherein determining the resonant frequency of the temperature sensor circuit comprises: determining a first resonant frequency of the temperature sensor circuit before heating the susceptor element; and determining a second resonant frequency of the temperature sensor circuit after heating the susceptor element.

Clause 54: The method of any of clauses 48-53, wherein determining the temperature of the susceptor element comprises: determining a change in resonant frequency based on a comparison of the first resonant frequency and the second resonant frequency; and determining the temperature of the susceptor element based on the change in resonant frequency.

Clause 55: The method of any of clauses 48-54, wherein: heating the susceptor element comprises providing, with an induction heating element, a first magnetic field to the susceptor element, wherein the first magnetic field induces a first electrical current in the susceptor element; and determining the resonant frequency of the temperature sensor circuit comprises determining a first resonant frequency of the temperature sensor circuit associated with the susceptor element based on heating the susceptor element with the first electrical current.

Clause 56: The method of any of clauses 48-55, further comprises: providing, with the induction heating element, a second magnetic field to the susceptor element, wherein the second magnetic field induces a second electrical current in the susceptor element; and determining a second resonant frequency of the temperature sensor circuit associated with the susceptor element based on heating the susceptor element with the second electrical current.

Clause 57: The method of any of clauses 48-56, wherein determining the temperature of the susceptor element comprises: determining a change in resonant frequency based on a comparison of the first resonant frequency and the second resonant frequency; and determining the temperature of the susceptor element based on the change in resonant frequency.

Clause 58: The method of any of clauses 48-57, wherein heating the susceptor element comprises providing a first magnetic field at a first frequency to heat the susceptor, and wherein determining the resonant frequency of the temperature sensor circuit comprises: exciting the inductor of the temperature sensor circuit with a second magnetic field at a second frequency; and determining the resonant frequency of the temperature sensor circuit based on the second magnetic field at the second frequency.

Clause 59: The method of any of clauses 48-58, wherein heating the susceptor element comprises providing a first magnetic field coil at a first frequency to heat the susceptor, and wherein determining the resonant frequency of the temperature sensor circuit comprises: exciting the inductor of the temperature sensor circuit with a second magnetic field coil at a different frequency; and determining the resonant frequency of the temperature sensor circuit based on the magnetic field with the different frequency.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

Figure 1:
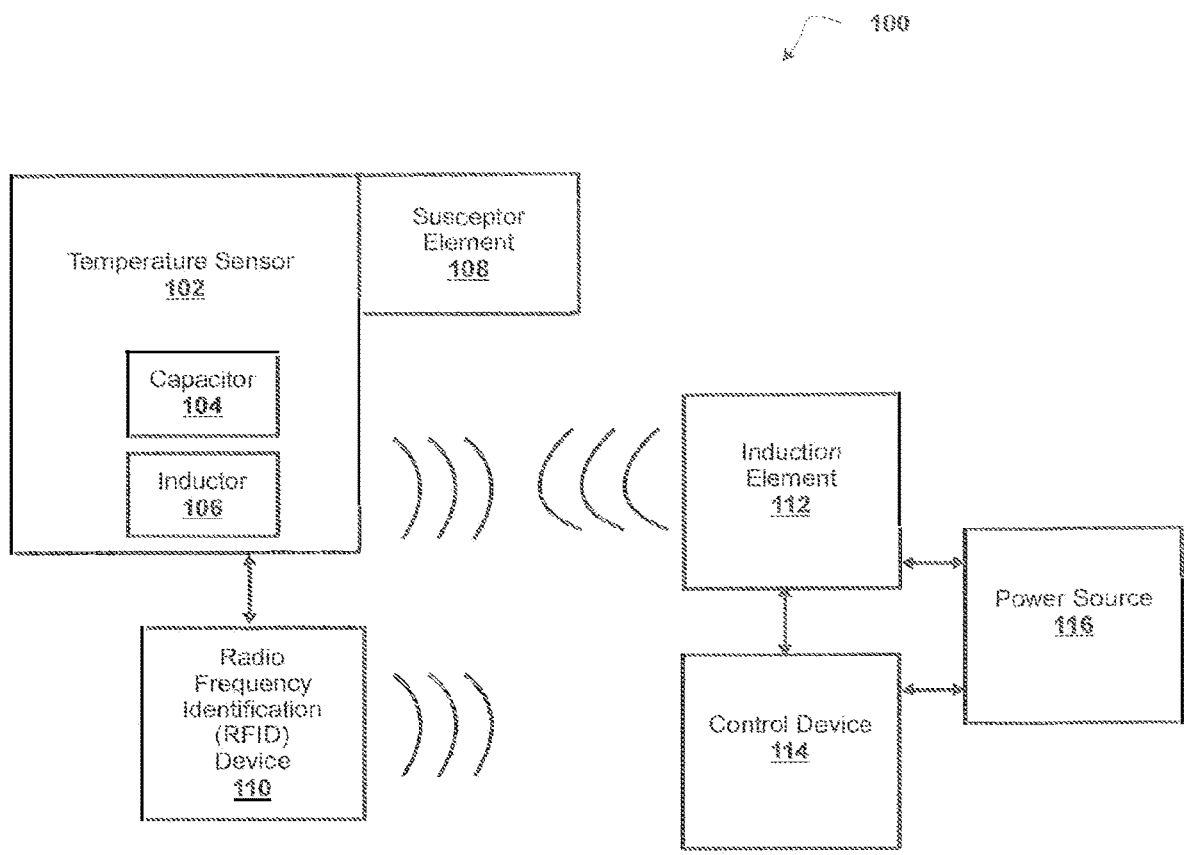
FIG. 1 is a diagram of a non-limiting embodiment of an induction heating system in which systems, devices, products, apparatus, and/or methods, described herein, may be implemented according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

In some non-limiting embodiments, an induction heating system may include an induction heating element and a susceptor. The induction heating system may be used to heat an object that is in thermal contact the susceptor (e.g., adjacent the susceptor so that an object can be heated by the susceptor, in contact with the susceptor so that an object can be heated by the susceptor, etc.). For example, a vaporizer device may include the induction heating system and the induction heating system may be used to heat a material (e.g., an organic material, a synthetic material, etc.) that is in thermal contact with the susceptor. In some non-limiting embodiments, the temperature of the susceptor may be controlled based on measuring the temperature of the susceptor. In some non-limiting embodiments, the temperature of the susceptor may be controlled so that a chemical composition of a vapor produced by a material that is heated by the induction heating system is within a desired range of chemical composition.

However, sensing the temperature of a susceptor with a device, such as a thermocouple, a silicon sensor chip, and/or an infrared thermometer, may be difficult based on a size of the susceptor and/or a size of the device used to measure the temperature of the susceptor. For example, in a vaporizer device, an induction heating system may be compact and the size of a device, such as a thermocouple, a silicon sensor chip, and/or an infrared thermometer, may prevent the device from being used to sense the temperature of the susceptor because the device cannot be in thermal contact with the susceptor. Furthermore, the device may not be able to be in thermal contact with the susceptor and to withstand the temperature of the susceptor. In addition, the device may not be able to accurately sense the temperature of the susceptor based on the device not being able to be in thermal contact with the susceptor.

Non-limiting embodiments of the present invention are directed to devices, systems, and methods for sensing temperature in an induction heating system. In some non-limiting embodiments, a system includes an induction element, a susceptor element; and a temperature sensor circuit in thermal contact with the susceptor element. In some non-limiting embodiments, the temperature sensor circuit includes a capacitor having a capacitance value equal to C and an inductor adjacent the capacitor, where the inductor has an inductance value equal to L. Additionally, a resonant frequency of the temperature sensor circuit changes based on a temperature of the susceptor element and the induction element is electromagnetically coupled to the temperature sensor. Further, the resonant frequency of the temperature sensor circuit is equal to $1/2\pi\sqrt{LC}$.

In this way, embodiments of the present invention allows for accurate sensing of the temperature of a susceptor element based on a temperature sensor circuit of the system being in thermal contact with the susceptor element. Furthermore, the temperature sensor circuit of the system is able to withstand the temperature of the susceptor based on the temperature sensor including a capacitor and inductor.

Referring now to FIG. 1, FIG. 1 is a diagram of an example induction heating system 100 in which devices, systems, and/or methods, described herein, may be implemented. As shown in FIG. 1, induction heating system 100 includes temperature sensor 102, susceptor element 108, radio frequency identification (RFID) device 110, induction element 112, control device 114, and power source 116. Induction element 112 and RFID device 110 may interconnect (e.g., establish a connection to communicate) via wireless connections. In some non-limiting embodiments, induction heating system 100 may not include RFID device 110. Additionally or alternatively, temperature sensor 102 and control device 114 may interconnect (e.g., establish a connection to communicate) via wired connections, wireless connections, or a combination of wired and wireless connections. In some non-limiting embodiments, induction heating system 100 may be a component within a device, a system, and/or the like. For example, induction heating system 100 may be a component within a vaporizer device (e.g., a vaporizer device as described herein).

Temperature sensor 102 may include one or more devices capable of sensing the temperature of an electrically conductive object (e.g., susceptor) in an induction heating system. For example, temperature sensor 102 may include a circuit, which includes capacitor 104 and inductor 106. In some non-limiting embodiments, temperature sensor 102 may have a size and configuration based on the application for which temperature sensor 102 may be applied. For example, temperature sensor 102 may have a length in the range of 4 mm to 10 mm and/or a diameter or a width in the range of 4 mm to 7 mm. In one example, temperature sensor 102 may have a length of 6 mm and/or a diameter or a width of 5 mm. In some non-limiting embodiments, a resonant frequency of temperature sensor 102 is nominally at 107 KHz at ambient temperature, and the resonant frequency may increase to 133 KHz at 200° C. In some non-limiting embodiments, a sensitivity of the resonant frequency of temperature sensor 102 may be 400 Hz/° C.

In some non-limiting embodiments, capacitor 104 may have a size and configuration based on the application for which temperature sensor 102 may be applied. For example, capacitor 104 may be a surface mount capacitor. In some non-limiting embodiments, capacitor 104 may have a length in the range of 0.5 mm to 6 mm. In one example, capacitor 104 may have a length of 1 mm. In one example, capacitor 104 may be a surface mount capacitor of standard size 1712 (e.g., 4.45 mm×3.175 mm). In some non-limiting embodiments, capacitor 104 may include a ceramic material. For example, capacitor 104 may be made from an XHT ceramic material and/or an X7R ceramic material. In some non-limiting embodiments, capacitor 104 may have a capacitance value in the range of 0.2 µF to 1 µF. In one example, capacitor 104 may have a capacitance value of 0.47 µF. In some non-limiting embodiments, capacitor 104 may include a material that is able to withstand a temperature up to 300° C.

In some non-limiting embodiments, inductor 106 may have a size and configuration based on the application for which temperature sensor 102 may be applied. For example, inductor 106 may be an induction coil or a planar inductor, such as a spiral inductor. In one example, inductor 106 may include an induction coil that has 37 turns of 36 gauge wire in 2 layers with a 4 mm inside diameter. In some non-limiting embodiments, inductor 106 may have an inductance value in the range of 2 pH to 6 µH. In one example, inductor 106 may have an inductance value of 4.7 µH. In some non-limiting embodiments, capacitor 104 and inductor 106 may be electrically connected in series.

Susceptor element 108 may include one or more devices capable of absorbing electromagnetic energy, generating heat based on electromagnetic energy that is absorbed, and/or providing heat (e.g., providing heat via conduction, providing heat via radiation, etc.) to an object (e.g., a substance, a device, a component, etc.) that is in thermal contact with the one or more devices. For example, susceptor element 108 may include a device made of a material that is electrically conductive. In some non-limiting embodiments, susceptor element 108 may include a metallic conductor that heats by eddy currents, iron, steel (e.g., stainless steel), a ceramic magnet (e.g., ferrite), an FeCrAl alloy, Kanthal, and/or a semiconductor. In some non-limiting embodiments, susceptor element 108 may have a length in the range of 10 mm to 18 mm. In one example, susceptor element 108 may have a length of 15 mm.

In some non-limiting embodiments, susceptor element 108 may have a configuration that includes a stranded wire, a stranded rope of material, a mesh, a mesh tube, several concentric mesh tubes, a cloth, a sheet of material, a porous solid (e.g., a foam), a roll of metal mesh, fibers of metal, or any other geometry that is appropriately sized and configured. In some non-limiting embodiments, susceptor element 108 may include fins, protrusions, or other details that are configured to hold a solid and/or semi-solid material in thermal contact with susceptor element 108.

Radio frequency identification (RFID) device 110 may include one or more devices capable of storing information and providing information based on receiving electromagnetic energy. For example, RFID device 110 may include an RFID tag, an RFID microchip (e.g., an integrated circuit, a microprocessor, etc.). In some non-limiting embodiments, RFID device 110 may include an RFID microchip that is electrically connected to inductor 106 and inductor 106 may act as an antenna. In some non-limiting embodiments, RFID device 110 may store information associated with susceptor element 108 and/or temperature sensor 102. For example, RFID device 110 may store information associated with an identification of susceptor element 108 and/or temperature sensor 102, information associated with a characteristic of susceptor element 108 and/or temperature sensor 102, and/or the like. Additionally or alternatively, RFID device 110 may store information associated with a vaporizer device. For example, RFID device 110 may store information associated with a vaporizable substance (e.g., a profile for heating a vaporizable substance) to be vaporized by an induction heating system of the vaporizer device. In some non-limiting embodiments, RFID device 110 may operate in the low frequency (LF) range for RFID. For example, RFID device 110 may operate in a frequency range from 30 KHz to 300 KHz. In one example, RFID device 110 may operate at a frequency of 125 KHz. In some non-limiting embodiments, RFID device 110 may operate in high frequency (HF) range for RFID. For example, RFID device 110 may operate in a frequency range from 3 MHz to 30 MHz. In one example, RFID device 110 may operate at a frequency of 13.5 MHz.

Induction element 112 may include one or more devices capable of providing a magnetic field to susceptor element 108 and/or temperature sensor 102 (e.g., inductor 106 of temperature sensor 102) and/or receiving a magnetic field from susceptor element 108 and/or temperature sensor 102 (e.g., inductor 106 of temperature sensor 102). For example, induction element 112 may include an induction coil or a planar inductor, such as a spiral inductor. In some non-limiting embodiments, induction element 112 may include an induction heating element that provides a electromagnetic energy (e.g., a magnetic field) to susceptor element 108 to cause susceptor element 108 to generate heat based on receiving the electromagnetic energy. In some non-limiting embodiments, induction element 112 may be separate from an induction heating element that provides electromagnetic energy to susceptor element 108.

Control device 114 may include one or more devices capable of providing a control signal to induction element 112, controlling power source 116 to provide power to induction element 112 (e.g., an induction heating element), and/or determining a temperature of susceptor element 108. For example, control device 114 may include a computing device, such as a computer, a processor, a microprocessor, and/or the like. In some non-limiting embodiments, control device 114 and/or induction element 112 may include an RFID reader. For example, control device 114 and/or induction element 112 may include an RFID reader that may communicate with RFID device 110.

Power source 116 may include one or more devices capable of providing power to an induction element (e.g., an induction heating element, induction element 112, etc.) and/or control device 114. For example, power source 116 may include an alternating current (AC) power supply (e.g., a generator, an alternator, etc.) and/or a direct current (DC) power supply (e.g., a battery, a capacitor, a fuel cell, etc.).

The number and arrangement of devices and networks shown in FIG. 1 are provided as an example. There may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of induction heating system 100 may perform one or more functions described as being performed by another set of devices of induction heating system 100.

Figure 2:
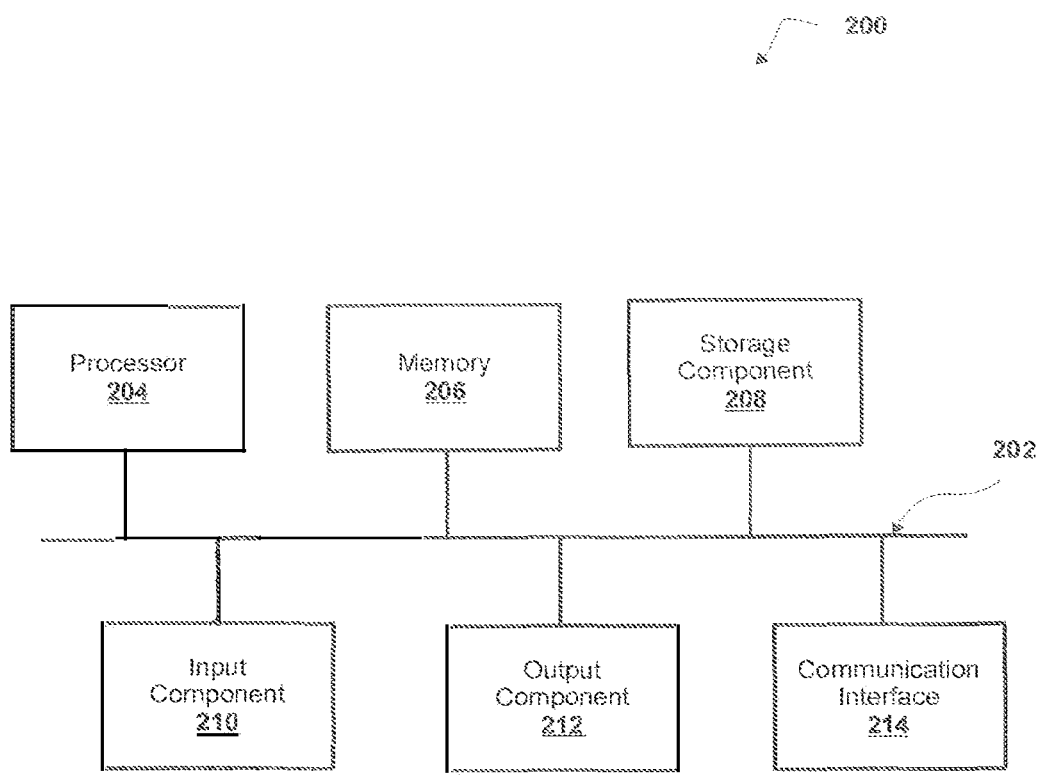
FIG. 2 is a diagram of a non-limiting embodiment of components of one or more devices of FIG. 1.

Referring now to FIG. 2, FIG. 2 is a diagram of example components of a device 200. Device 200 may correspond to control device 114. In some non-limiting embodiments, control device 114 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a temperature sensor, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
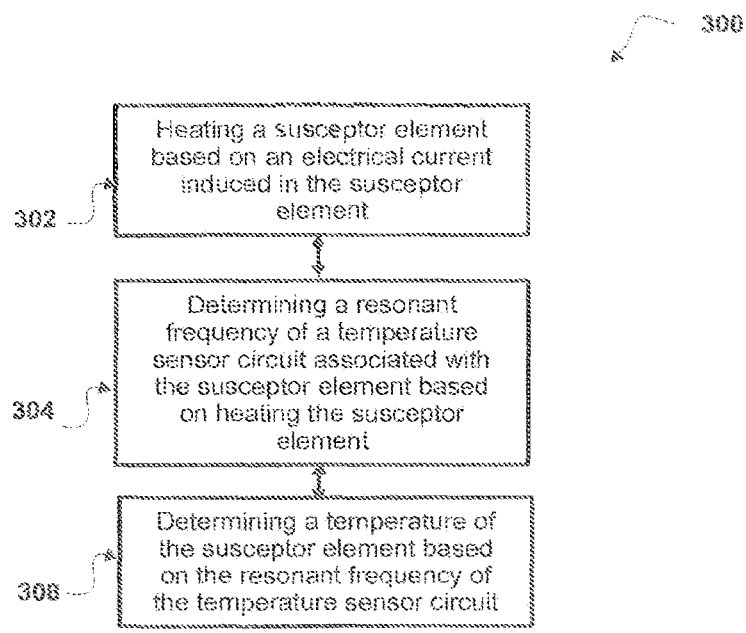
FIG. 3 is a flowchart of a non-limiting embodiment of a process for sensing temperature in an induction heating system.

Referring now to FIG. 3, FIG. 3 is a flowchart of a non-limiting embodiment of a process 300 for sensing temperature in an induction heating system. In some non-limiting embodiments, one or more of the steps of process 300 may be performed (e.g., completely, partially, etc.) by control device 114. In some non-limiting embodiments, one or more of the steps of process 300 may be performed by another device or a group of devices separate from or including control device 114.

As shown in FIG. 3, at step 302, process 300 includes heating a susceptor element based on an electrical current induced in the susceptor element. For example, an induction heating element (e.g., induction element 112) may provide a magnetic field (e.g., a magnetic induction field, a magnetic field, etc.) that is received by susceptor element 108. Susceptor element 108 may generate heat within susceptor element 108 based on electric currents that are generated inside susceptor element 108 based on the magnetic field being received by susceptor element 108.

In some non-limiting embodiments, the induction heating element may be powered by power source 116. For example, the induction heating element may receive an electrical current from power source 116 based on control device 114 controlling the induction heating element and/or power source 116. In some non-limiting embodiments, control device 114 may cause the induction heating element to provide a magnetic field to susceptor element 108. For example, control device 114 may provide a control signal to the induction heating element, and the induction heating element may provide the magnetic field to susceptor element 108 based on the control signal from control device 114.

As further shown in FIG. 3, at step 304, process 300 includes determining a resonant frequency of a temperature sensor circuit associated with the susceptor element based on heating the susceptor element. For example, control device 114 may determine the resonant frequency of temperature sensor 102 associated with susceptor element 108 when susceptor element 108 generates heat.

In some non-limiting embodiments, control device 114 may determine the resonant frequency of temperature sensor 102 based on capacitor 104 and inductor 106. For example, control device 114 may determine the resonant frequency of temperature sensor 102 based on the equation: $1/2\pi\sqrt{LC}$, where L is the inductance value of inductor 106 and C is the capacitance value of capacitor 104. In some non-limiting embodiments, control device 114 may determine the resonant frequency of temperature sensor 102 based on a magnetic field provided by inductor 106 that is received by induction element 112. For example, control device 114 may cause induction element 112 to provide a first magnetic field to temperature sensor 102, which is received by inductor 106. Inductor 106 may provide a second magnetic field based on receiving the first magnetic field from induction element 112. Induction element 112 may receive the second magnetic field from inductor 106. Control device 114 may determine the resonant frequency of temperature sensor 102 based on the second magnetic field provided by inductor 106 that is received by induction element 112. In some non-limiting embodiments, the second magnetic field may include a component of the first magnetic field that has a different frequency than the first magnetic field.

As further shown in FIG. 3, at step 308, process 300 includes determining a temperature of the susceptor element based on the resonant frequency of the temperature sensor circuit. For example, control device 114 may determine the temperature of susceptor element 108 based on the resonant frequency of temperature sensor 102. In some non-limiting embodiments, control device 114 may determine the temperature of susceptor element 108 based on a change in the resonant frequency of temperature sensor 102. For example, control device 114 may determine a first resonant frequency of temperature sensor 102 when susceptor element 108 is heated by an induction heating element based on a first magnetic field provided by the induction heating element. Control device 114 may determine a second resonant frequency of temperature sensor 102 when susceptor element 108 is heated by the induction heating element based on a second magnetic field provided by the induction heating element. Control device 114 may compare the first resonant frequency and the second resonant frequency to determine the temperature of susceptor element 108 based on a change in the resonant frequency of temperature sensor 102 from the first resonant frequency to the second resonant frequency.

In some non-limiting embodiments, the resonant frequency of temperature sensor 102 may change based on a change in the capacitance value of capacitor 104. For example, when susceptor element 108 is heated, a temperature of capacitor 104 of temperature sensor 102 may increase. Based on the increase in the temperature of capacitor 104, the capacitance value of capacitor 104 may decrease.

Figure 4A:
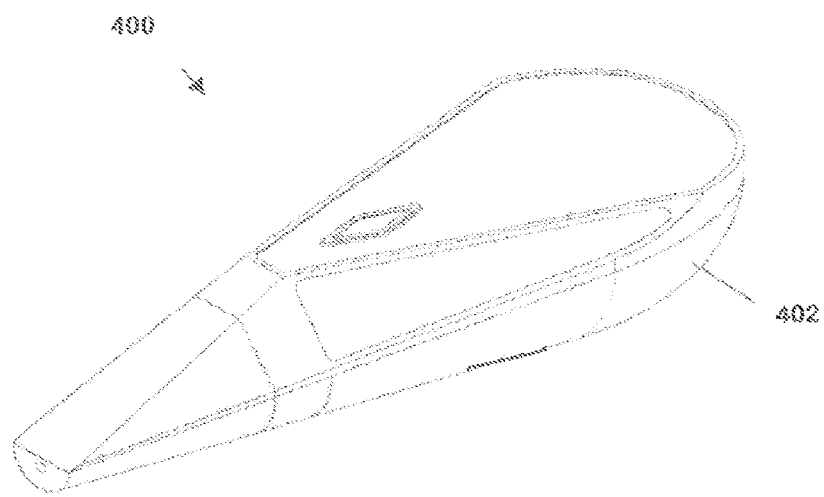
FIGS. 4A-4C are diagrams of a non-limiting embodiment of a vaporizer device having an induction heating system.
Figure 4B:
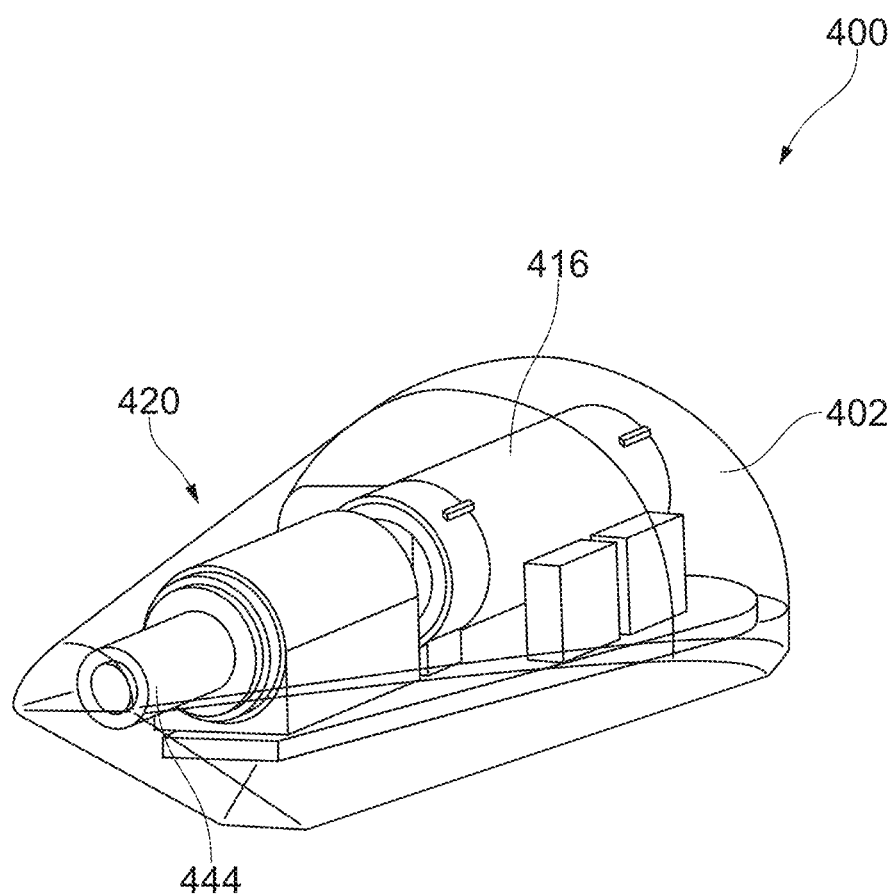
Figure 4C:
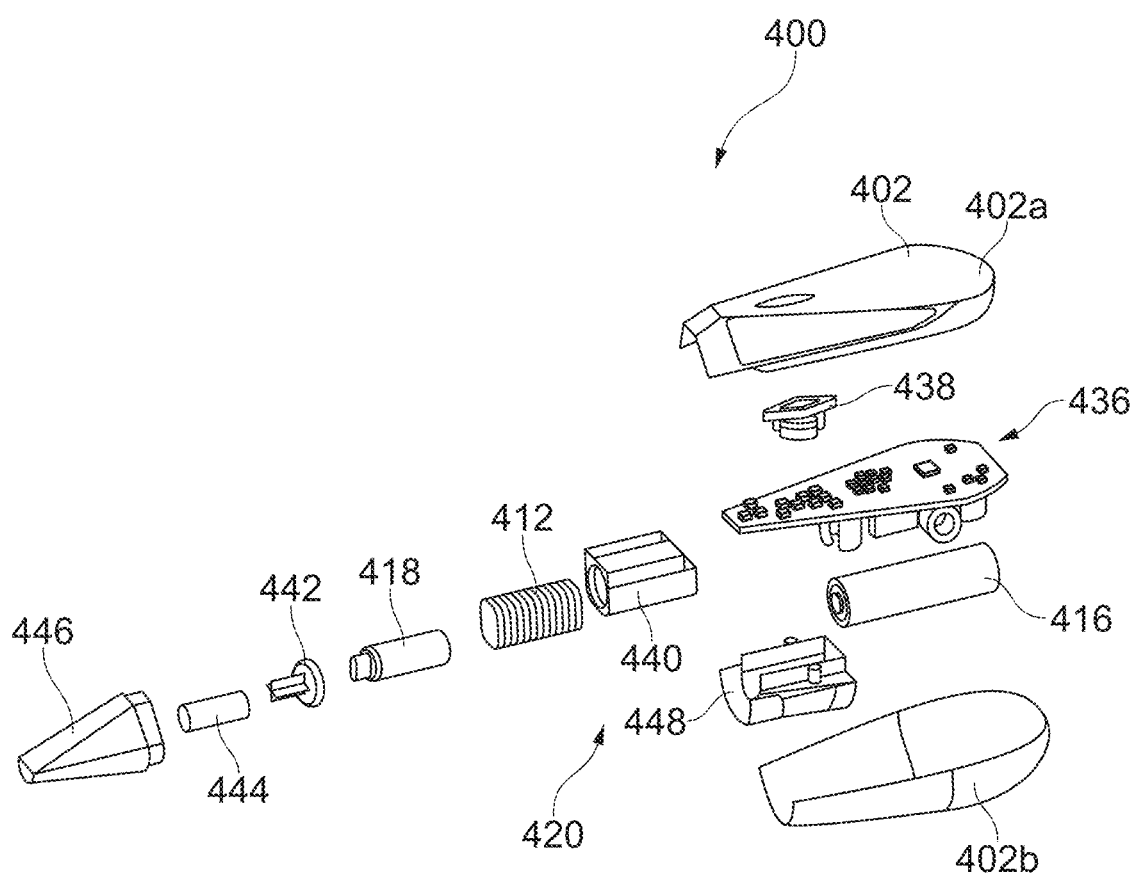

FIGS. 4A-4C are diagrams of a non-limiting embodiment of vaporizer device 400 having an induction heating system. FIGS. 4A and 4B show assembled views of vaporizer device 400, and FIG. 4C shows a disassembled view of vaporizer device 400. As shown in FIG. 4A, vaporizer device 400 may include housing 402. For the purpose of illustration, FIG. 4B depicts vaporizer device 400 with housing 402 being transparent. As shown in FIG. 4B, vaporizer device 400 may include induction heating assembly 420, housing 402, power source 416, and tube 444. As shown in FIG. 4C, vaporizer device 400 may include electronic control components 436, at least one activation button 438, induction heating assembly 420, cartridge 418, housing 402, power source 416, valve 442, tube 444, and mouthpiece component 446.

In some non-limiting embodiments, induction heating assembly 420 may include chassis 448 (e.g., an internal frame to support components of induction heating assembly 420), induction heating element 412 (e.g., an induction coil), and/or heating element body 440. For example, heating element body 440 may be sized and/or configured to hold induction heating element 412 when it is disposed within heating element body 440. Additionally or alternatively, chassis 448 may be sized and/or configured to hold induction heating element 412 and heating element body 440 in proximity to electronic control components 436, which may allow for compact size and control of induction heating element 412 with electronic control components 436. Additionally or alternatively, heating element body 440 may act as an insulator to the heat generated by induction heating of a susceptor element (e.g., a wick element, a wick, etc.) within cartridge 418 and also shields electronic components from radiation of electromagnetic energy generated by induction heating element 412.

In some non-limiting embodiments, cartridge 418 may be sized and configured to fit within induction heating element 412, which may allow for compact construction of the vaporizer device 400. Cartridge 418 may have an aperture in one end that allows the vapor or aerosol from the vaporizable substance to flow out of cartridge 418. In some non-limiting embodiments, cartridge 418 may be configured with a reservoir and the reservoir may be structured to hold a vaporizable substance. A susceptor element may be configured to be contained within the reservoir, and the susceptor element may contact the vaporizable substance of the reservoir. Induction heating element 412 may be configured to be housed within heating element body 440. Induction heating element 412 may be inductively coupled to a susceptor element within cartridge 418, such that the susceptor element is heated by electromagnetic induction through heat generated in the susceptor element by eddy currents.

In some non-limiting embodiments, cartridge 418 may be a replaceable and/or disposable container for vaporizer device 400. For example, cartridge 418 may contain a predetermined amount of a vaporizable substance, and when the vaporizable is used up or near to be used up, a user may replace cartridge 418 (e.g., with another cartridge). For the purpose of illustration, the vaporizable substance may be any composition, material, or matter that produces a vapor for inhalation by a human being when heated to a predetermined temperature. In some non-limiting embodiments, vaporizer device 400 may include an indicator of the amount of vaporizable substance remaining in a cartridge. For example, the indicator may be located on the cartridge and/or on the housing of vaporizer device 400. In some non-limiting embodiments, the indicator may include a digital or analog output screen located on vaporizer device 400 that is visible to a user. In some non-limiting embodiments, vaporizer device 400 may have a second indicator that indicates when cartridge 418 is close to empty and acts as a low volume indicator for the vaporizable substance.

In some non-limiting embodiments, cartridge 418 may be configured to be refilled with a vaporizable substance. Additionally or alternatively, cartridge 418 may be configured to be refilled while located within vaporizer device 400 such as through a vent or aperture in housing 402. In some non-limiting embodiments, induction heating element 412 (e.g., an induction coil) may be formed as part of a replaceable cartridge such that a cartridge structure (e.g., the cartridge body, the susceptor element, and the induction coil) may be designed to be replaced. For example, such a replaceable cartridge may include electrical connections to connect the induction coil to other electronic control components.

In some non-limiting embodiments, replacement of cartridge 418 may be accomplished by removing housing 402 and separating any additional components as desired. In some non-limiting embodiments, replacement of cartridge 418 may be accomplished without removal of housing 402. For example, vaporizer device 400 may allow a user to remove an empty cartridge 418 and to replace it with a new, full cartridge 418 within induction heating assembly 420 without removing any components. In some non-limiting embodiments, vaporizer device 400 may include a channel or chamber defined therein that allows for removal of an empty or near empty cartridge 418 and accepts a replacement cartridge 418. In some non-limiting embodiments, vaporizer device 400 may include a chamber or channel that may be manipulated (e.g., folded, twisted, and/or the like) to open to accept a new cartridge 418 and then may be manipulated to close and place cartridge 418 in the appropriate position (e.g., to enable heating of the vaporizable substance within cartridge 418). In some non-limiting embodiments, housing 402 may have a chamber or channel defined therein, and housing 402 may be configured to receive cartridge 418 within the chamber or channel.

In some non-limiting embodiments, the susceptor element may be located within cartridge 418, and the susceptor element may be heated via induction without electrical connections to power source 416. Additionally or alternatively, cartridge 418 may include a body having an inside surface, and the susceptor element may be positioned adjacent to the inside surface of cartridge 418. Additionally or alternatively, the body and/or a neck of cartridge 418 may act as an insulating member between the susceptor element and the induction heating assembly 420. For example, such an insulating member may remove (e.g., separate) the induction heating assembly 420 (e.g., induction coil) from contact with the vaporizable substance (e.g., a liquid) in cartridge 418. In some non-limiting embodiments, cartridge 418 may be made of an appropriate insulating material, including but not limited to glass, fiberglass, ceramic, and/or the like. In some non-limiting embodiments, an open end of cartridge 418 may define an air path through vaporizer device 400.

In some non-limiting embodiments, activation button 438 may be configured to protrude through an aperture in housing 402, e.g., so that a user may activate vaporizer device 400. Additionally or alternatively, activation button 438 may be configured such that a depression of a physical button is not necessary. For example, activation button 438 may include a touchscreen component, such as a capacitive touchscreen. Additionally or alternatively, using such a touch screen, a user may work with vaporizer device 400 to review and/or verify information such as age, number of uses, and other analytics. Additionally or alternatively, such touchscreen capability may be combined with onboard sensors to thereby form a smart vaporizer, which may be capable of being connected for communication and networked to local computers or the internet.

In some non-limiting embodiments, activation button 438 may be integrated with another aspect and/or component of vaporizer device 400. For example, activation button 438 may be integrated with mouthpiece component 446. For the purpose of illustration, contact with a user's mouth to mouthpiece component 446 may allow for activation (e.g., act as activation button 438) of vaporizer device 400. Additionally or alternatively, activation button 438 may include a biometric identification device (e.g., a fingerprint scanner) and/or another form of identification device to identify the user. For example, a user may personalize vaporizer device 400 and/or prevent others from using vaporizer device 400. For the purpose of illustration, such features may be helpful in situations where monitoring of vaporizer device 400 is not always available and/or may prevent another unauthorized user (e.g., a child) from using the device.

In some non-limiting embodiments, housing 402 may be sized and/or configured to substantially house, or enclose, the components of vaporizer device 400, to provide an external appearance to the device, and/or to be shaped to fit ergonomically in the hand of a user. In some non-limiting embodiments, housing 402 may include upper housing 402a and lower housing 402b. For example, upper housing 402a and lower housing 402b may be structured with an aesthetically pleasing appearance (e.g., to mimic the appearance of a wood grain) and/or may include colors, shapes, indicia, and/or the like, as desired. In some non-limiting embodiments, upper housing 402a and lower housing 402b may be replaceable to allow for a user to customize a particular appearance of vaporizer device 400.

In some non-limiting embodiments, housing 402 may be made from any suitable material such as wood, metal, fiberglass, plastic, and/or the like. In some non-limiting embodiments, mouthpiece component 446 may be interchangeable. For example, variants of mouthpiece component 446 may be designed such that mouthpiece component 446 may restrict airflow to reproduce the pulling sensation, e.g., similar to the sensation users may prefer and/or be familiar with in respect to smoking cigarettes, cigars, pipes, and/or the like. In some non-limiting embodiments, activation button 438 may include one or more control buttons, sensors, or switches, e.g., to allow a user to interact with vaporizer device 400. In some non-limiting embodiments, the simplest interaction of activation button 438 may be turning the vaporizer device on and off.

In some non-limiting embodiments, a susceptor element may be configured to heat substances that are adjacent to and/or in contact with the material of the susceptor element. For example, a vaporizable substance may be heated based on induction heating of the susceptor element by induction heating assembly 420. In some non-limiting embodiments, the susceptor element may be configured to transfer a vaporizable substance from the reservoir based on a capillary action of the susceptor element. In some non-limiting embodiments, the vaporizable substance may be a liquid and/or viscous substance, and as the liquid is vaporized, more liquid may move up the susceptor element.

In some non-limiting embodiments, the configuration of the susceptor element may be a stranded wire, a stranded rope of material, a mesh, a mesh tube, several concentric mesh tubes, a cloth, sheets of material, a foam (or other porous solid) with sufficient porosity, a roll of fine metal mesh or some other arrangement of metal foil, fibers or mesh, and/or any other geometry that is appropriately sized and configured to carry out the wicking action, as described herein. Additionally or alternatively, the susceptor element may further include fins, protrusions, or other details that may be configured to hold a solid or semi sold material in contact with the susceptor element.

In some non-limiting embodiments, the susceptor element may be constructed of a combination of materials to achieve an appropriate effect. For example, the susceptor element may be an interwoven cloth (or otherwise intimately mixed combination) of fine induction heating wires, strands, and/or threads with wicking wires, strands, and/or threads. Additionally or alternatively, the materials of the susceptor element may be combined in the form of a rope or foam, or suitably deployed thin sheets of material. In some non-limiting embodiments, the susceptor element may include rolled up alternating foils of material. Additionally or alternatively, the susceptor element may be surrounded (e.g., partially, completely, and/or the like) by induction heating element 412 (e.g., induction coil), which may not necessarily be in contact with the mesh. In some non-limiting embodiments, as the susceptor element may be formed from a mesh, the mesh wick may be made of a material that is efficiently heated by induction (e.g., a FeCrAl alloy). In some non-limiting embodiments, the mesh wick may be formed using a Kanthal mesh. Additionally or alternatively, the susceptor element may be removable from cartridge 418 so that the susceptor element may be able to be cleaned, reused, and/or replaced separate from cartridge 418.

In some non-limiting embodiments, the materials used in the susceptor element may include a magnetic material and/or a metallic conductor. Additionally or alternatively, the susceptor element may include materials that produce heat eddy currents and/or magnetic hysteresis when the susceptor element is exposed to electromagnetic energy from an electromagnetic field. For example, magnetic and/or metallic conductor materials that have considerable hysteresis in the range of electromagnetic fields may be employed with vaporizer device 400. In some non-limiting embodiments, the susceptor element may include a material such that heating is carried out both by eddy currents and also by movement of the magnetic domain walls. In some non-limiting embodiments, the susceptor element material may be iron. In some non-limiting embodiments, the susceptor element may include ceramic magnets, such as ferrite. In some non-limiting embodiments, the susceptor element may include metallic conductors that heat by eddy currents. In some non-limiting embodiments, the susceptor element may include a semiconductor.

In some non-limiting embodiments, valve 442 may be configured to control airflow and/or seal off the reservoir when vaporizer device 400 is not in use. In some non-limiting embodiments, valve 442 may be sized and/or configured to fit over an end of cartridge 418 that has an aperture. Additionally or alternatively, valve 442 may have a shape that allows for precise attachment to cartridge 418 and/or that is sized and/or configured to contact and/or rest on the end of induction heating element 412 (e.g., induction coil) to place cartridge 418 within induction heating element 412. In some non-limiting embodiments, cartridge 418 may be entirely within induction heating element 412 or only a portion of cartridge 418 may be within induction heating element 412. In some non-limiting embodiments, valve 442 may be electronically controlled and may be configured to remain closed until activation of vaporizer device 400 by a user (e.g., by way of activation button 438). In some non-limiting embodiments, valve 442 may be manually controlled by a thread and/or ramp in the mouth piece. For example, the thread and/or ramp may control a gap between valve 442 and a top of cartridge 418. In some non-limiting embodiments, valve 442 may be made of any suitable material, such as plastic, rubber, fiberglass, metal, glass, and/or the like. In some non-limiting embodiments, valve 442 may be made from a suitable grade of silicone rubber.

In some non-limiting embodiments, tube 444 may be sized and/or configured to be placed over an end of valve 442 distal from cartridge 418 and/or to direct the vapor and/or aerosol from the vaporizable substance out of mouthpiece component 446. In some non-limiting embodiments, tube 444 may be a cylinder. In some non-limiting embodiments, tube 444 may be formed of any suitable material, including, but not limited to, glass. In some non-limiting embodiments, tube 444 may be configured to work with valve 442 to adjust airflow into and/or out of vaporizer device 400 and/or, when closed, to prevent leakage of the vaporizable substance.

In some non-limiting embodiments, power may be provided to induction heating element 412 from power source 416. In some non-limiting embodiments, power source 416 may be any form of a device that include one or more electrochemical cells that convert stored chemical energy into electrical energy. Additionally or alternatively, power source 416 may be sized appropriately for the application (e.g., placement within vaporizer device 400). In some non-limiting embodiments, power source 416 may be a battery. For example, the battery may be a primary battery, a secondary battery, a rechargeable battery, and/or the like. Additionally or alternatively, the battery may include an alkaline battery, a watch battery, a Lithium Ion battery, and/or the like.

In some non-limiting embodiments, electronic components (e.g., electronic control components 436) of vaporizer device 400 may include a circuit that includes a current generating device, a processor, and at least one sensor. Additionally or alternatively, the power supplied to induction heating element 412 (e.g. induction coil) may be controlled by the processor, which may provide precise monitoring and/or control of the power supplied to induction heating element 412 on a time scale that may be as low as a few milliseconds. In some non-limiting embodiments, the processor may be configured to receive information from the sensor and/or able to adjust a heating profile applied to the susceptor element by induction heating element 412. In some non-limiting embodiments, the sensor may be able to detect and/or calculate information, such as airflow from or into vaporizer device 400, pressure at locations within vaporizer device 400 or of the vapor exiting vaporizer device 400, temperature of the components or locations near the components of vaporizer device 400, such as the temperature of the induction coil, and/or the like. For example, such features may allow the circuit to sense that the user of vaporizer device 400 is beginning to inhale and/or that a power level may be increased to compensate for a tendency of the incoming air to cool the susceptor element (e.g., below its ideal temperature, operating temperature range, and/or the like). In some non-limiting embodiments, when an active inhalation is not in progress, the circuit may be able to then reduce the power, which may improve the life of power source 416.

In some non-limiting embodiments, the processor may be able to use the information to calculate and/or implement a temperature profile (e.g., optimal temperature profile and/or the like). Additionally or alternatively, the processor may be configured to adjust a heating profile applied to the susceptor element by induction heating element 412 based on the vaporizable substance. For example, the processor may be able to implement a predetermined heating profile according to the vaporizable substance. In some non-limiting embodiments, the processor may allow the user to modify the settings and/or the entire algorithm for providing the heat in order to obtain an improved experience (e.g., preferred experience, best experience, and/or the like). In some non-limiting embodiments, the design and/or configuration of all of the electronic components (e.g., electronic control components 436 and/or the like) may be sufficiently energy efficient to allow vaporizer device 400 to be hand held and battery operated. Additionally or alternatively, the electronic components may include a printed circuit board and, in some non-limiting embodiments, the processor may include a microprocessor, a microcontroller, and/or the like.

In some non-limiting embodiments, cartridge 418 may include an identifier that includes content information regarding the contents of cartridge 418. For example, the identifier may be incorporated into cartridge 418, e.g., as a barcode or other mechanism that may provide a signal regarding a vaporizable substance and/or susceptor element within cartridge 418. In some non-limiting embodiments, the processor may be coupled to induction heating element 412 and/or programmed to read the content information of cartridge 418 so that it is used to set parameters and cause induction heating element 412 to apply a heating profile to the vaporizable substance according to the content information of cartridge 418.

Figure 5:
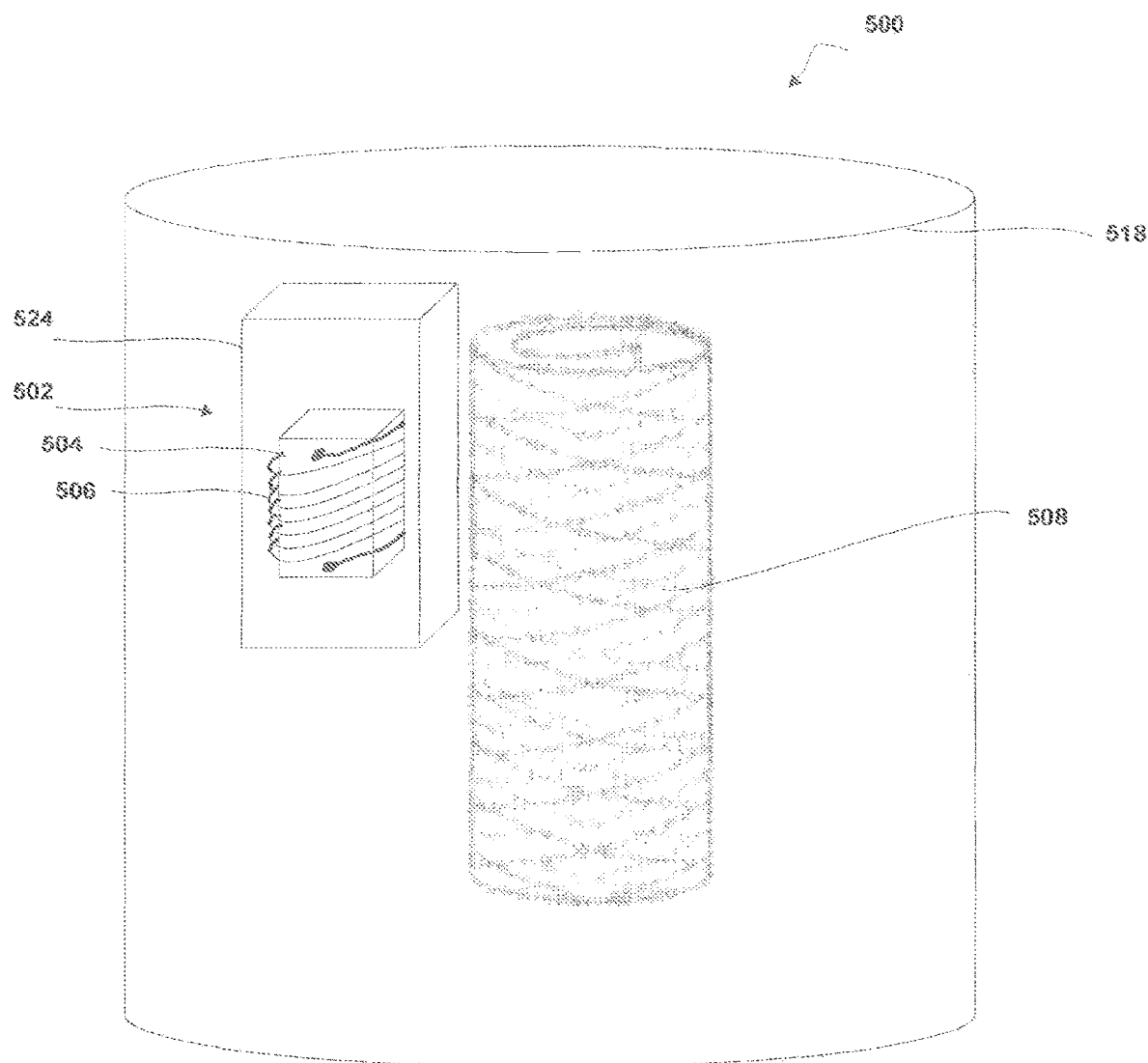
FIG. 5 is a diagram of a non-limiting embodiment of a cartridge assembly.

FIG. 5 is a diagram of a non-limiting embodiment of cartridge assembly 500. As shown in FIG. 5, cartridge assembly 500 includes temperature sensor 502, susceptor element 508, and cartridge 518. In some non-limiting embodiments, temperature sensor 502 may be the same as or similar to temperature sensor 102. In some non-limiting embodiments, susceptor element 508 may be the same as or similar to susceptor element 108. In some non-limiting embodiments, cartridge 518 may be the same as or similar to cartridge 418. As further shown in FIG. 5, temperature sensor 502 includes capacitor 504 and inductor 506. In some non-limiting embodiments, capacitor 504 may be the same as or similar to capacitor 104 and inductor 506 may be the same as or similar to inductor 106.

As further shown in FIG. 5, temperature sensor 502 may be enclosed (e.g., sealed on all sides) in structure 524. In this way, temperature sensor 502 may be enclosed in structure 524 so that temperature sensor 502 does not interact (e.g., chemically interact, physically interact, etc.) with an environment inside of cartridge 518 but temperature sensor 502 is in thermal contact with susceptor element 508 to sense a temperature of susceptor element 508. In some non-limiting embodiments, structure 524 may include a material that allows for structure 524 to be inert (e.g., to not chemically interact, to not physically interact, etc.) with an environment inside of cartridge 518. For example, structure 524 may include a material that allows for structure 524 to be inert with regard to a vaporizable substance inside of cartridge 518. In some non-limiting embodiments, the material of structure 524 may include glass, fiberglass, plastic, and/or the like. In some non-limiting embodiments, structure 524 may electrically conductive contacts (e.g., pins, electrical contacts, vias, etc.) located on an exterior surface of structure 524 so that information may be communicated using an electrical connection established based on the electrically conductive contacts. In some non-limiting embodiments, structure 524 may include pins located on an exterior surface of structure 524 and/or electrical contacts located on an exterior surface of structure 524 that are electrically connected to pins located on an exterior surface of capacitor 504 and/or electrical contacts located on an exterior surface of capacitor 504.

In some non-limiting embodiments, structure 524 (e.g., structure 524 enclosing temperature sensor 502) and/or susceptor element 508 may be located in cartridge 518. For example, structure 524 may be in thermal contact with susceptor element 508 and structure 524 and susceptor element 508 may be located in cartridge 518. In some non-limiting embodiments, structure 524 may be in physical contact with (e.g. touching) susceptor element 508. For example, structure 524 may be in physical contact with susceptor element 508 on an end of susceptor element 508, at a point at an end of susceptor element 508, at a point in the middle of susceptor element 508, at a point adjacent the middle of susceptor element 508, and/or the like.

Figure 6:
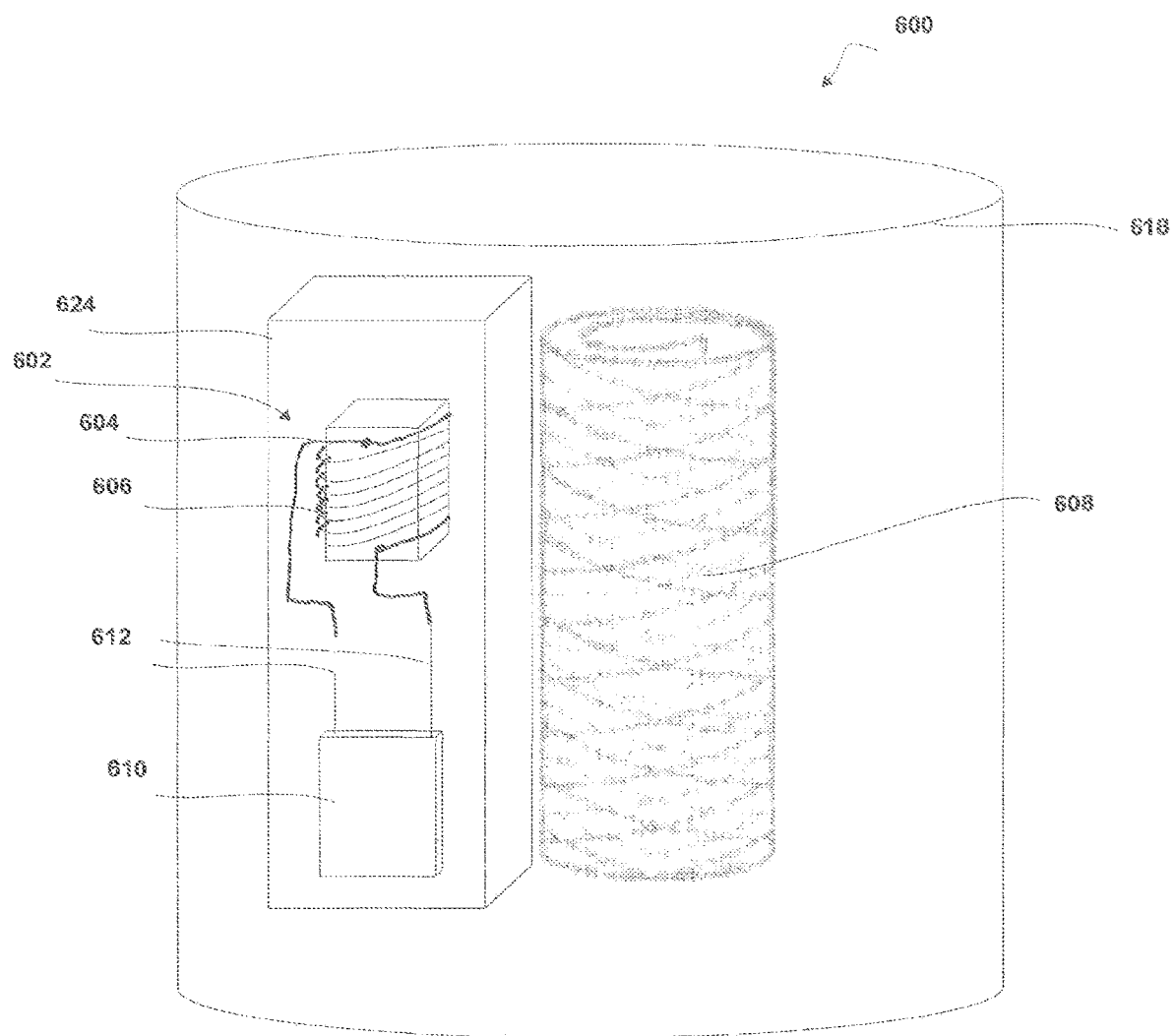
FIG. 6 is a diagram of a non-limiting embodiment of a cartridge assembly.

FIG. 6 is a diagram of a non-limiting embodiment of cartridge assembly 600. As shown in FIG. 6, cartridge assembly 600 includes temperature sensor 602, susceptor element 608, RFID device 610, and cartridge 618. In some non-limiting embodiments, temperature sensor 602 may be the same as or similar to temperature sensor 502 and/or temperature sensor 102. In some non-limiting embodiments, susceptor element 608 may be the same as or similar to susceptor element 508 and/or susceptor element 108. In some non-limiting embodiments, cartridge 618 may be the same as or similar to cartridge 518 and/or cartridge 418. In some non-limiting embodiments, RFID device 610 may be the same as or similar to RFID device 110. As further shown in FIG. 6, temperature sensor 602 includes capacitor 604 and inductor 606. In some non-limiting embodiments, capacitor 604 may be the same as or similar to capacitor 504 and/or capacitor 104 and inductor 506 may be the same as or similar to inductor 106.

As further shown in FIG. 6, temperature sensor 602 and RFID device 610 may be enclosed (e.g., sealed on all sides) in structure 624. In this way, temperature sensor 502 and RFID device 610 may be enclosed in structure 624 so that temperature sensor 602 and RFID device 610 do not interact (e.g., chemically interact, physically interact, etc.) with an environment inside of cartridge 618 but temperature sensor 602 is in thermal contact with susceptor element 608 to sense a temperature of susceptor element 608 and RFID device 610 is electromagnetically coupled (e.g., is able to transfer electromagnetic energy wirelessly) to an RFID reader (e.g., an induction element, induction element 112, control device 114, etc.) to communicate information stored by RFID device 610 to the RFID reader. In some non-limiting embodiments, structure 624 may be the same as or similar to structure 524.

As further shown in FIG. 6, leads 612 of RFID device 610 may be connected (e.g., electrically connected) to each of the ends of inductor 606. For example, leads 612 of RFID device 610 may be connected to each of the ends of inductor 606 based on pins located on an exterior surface of capacitor 604, electrical contacts located on an exterior surface of capacitor 604, and/or the like. In this way, a magnetic field provided by an induction element (e.g., induction element 112) may provide power to the RFID device 610 based on the inductor 606 acting as an antenna for RFID device 610. Accordingly, the RFID device 610 may have a size that is smaller than a size of the RFID device 610 if RFID device 610 included an antenna to receive a magnetic field provided by the induction element.

Figure 7:
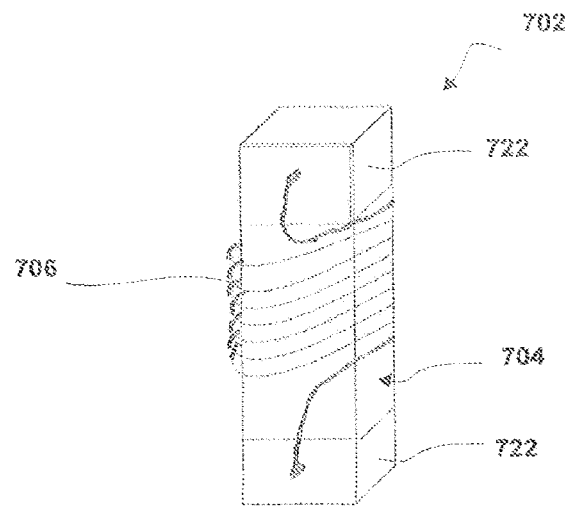
FIG. 7 is a diagram of a non-limiting embodiment of a temperature sensor.

FIG. 7 is a diagram of a non-limiting embodiment of temperature sensor 702. As shown in FIG. 7, temperature sensor 702 may include a circuit. The circuit of temperature sensor 702 includes capacitor 704 and inductor 706. In some non-limiting embodiments, capacitor 704 may be the same as or similar to capacitor 604, capacitor 504, and/or capacitor 104. In some non-limiting embodiments, inductor 706 may be the same as or similar to inductor 606, inductor 506, and/or inductor 106. As further shown in FIG. 7, temperature sensor 702 includes capacitor 704 and inductor 706. In some non-limiting embodiments, capacitor 704 may include a metal end cap 722 at a first end of capacitor 704 and a metal end cap 722 at a second end of capacitor 704. In some non-limiting embodiments, the metal end cap 722 may be mounted on, formed on, and/or an end of capacitor 704. Additionally or alternatively, each of the ends of inductor 606 may be electrically connected to a metal end cap 722. In some non-limiting embodiments, temperature sensor 702 may be enclosed in a structure (e.g., structure 524, structure 624, etc.).

Figure 8:
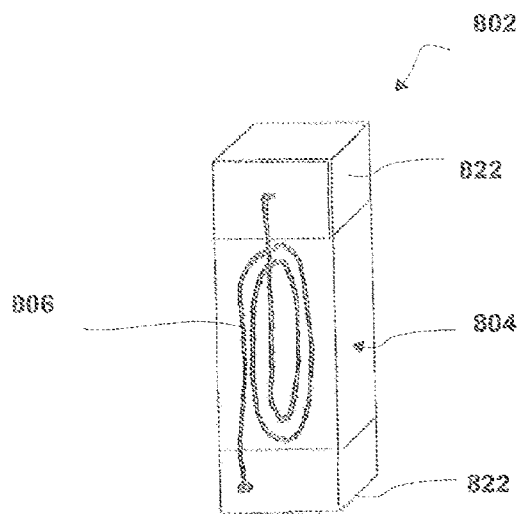
FIG. 8 is a diagram of a non-limiting embodiment of a temperature sensor.

FIG. 8 is a diagram of a non-limiting embodiment of temperature sensor 802. As shown in FIG. 8, temperature sensor 802 may include a circuit. The circuit of temperature sensor 802 includes capacitor 804 and inductor 806. In some non-limiting embodiments, capacitor 804 may be the same as or similar to capacitor 704, capacitor 604, capacitor 504, and/or capacitor 104. In some non-limiting embodiments, inductor 806 may be the same as or similar to inductor 706, inductor 606, inductor 506, and/or inductor 106. As further shown in FIG. 7, inductor 706 is a spiral inductor that is aligned with an exterior surface of capacitor 804. In some non-limiting embodiments, capacitor 804 may include a metal end cap 822 at a first end of capacitor 804 and a metal end cap 822 at a second end of capacitor 804. In some non-limiting embodiments, the metal end cap 822 may be mounted on, formed on, and/or an end of capacitor 804. Additionally or alternatively, each of the ends of inductor 806 may be electrically connected to a metal end cap 822. In some non-limiting embodiments, temperature sensor 802 may be enclosed in a structure (e.g., structure 524, structure 624, etc.).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for sensing temperature in a vaporizer device, the system comprising:
    an induction element;
    a susceptor element; and
    a temperature sensor circuit in thermal contact with the susceptor element, the temperature sensor circuit comprising:
        a capacitor, and
        an inductor,
    wherein a resonant frequency of the temperature sensor circuit changes based on a temperature of the susceptor element,
    wherein the induction element is electromagnetically coupled to the temperature sensor circuit,
    wherein the induction element comprises an induction heating element configured to create a first magnetic field around the susceptor element, and
    wherein the susceptor element generates heat based on the first magnetic field.

2. The system according to claim 1, further comprising a radio frequency identification (RFID) device electrically connected to the temperature sensor circuit.

3. The system according to claim 2, wherein the RFID device comprises an RFID microchip electrically connected to the inductor of the temperature sensor circuit.

4. The system according to claim 1, wherein the induction element is configured to provide the first magnetic field to the temperature sensor circuit.

5. The system according to claim 4, wherein the induction element is configured to receive a second magnetic field from the temperature sensor circuit.

6. The system according to claim 5, further comprising a control device configured to determine the resonant frequency of temperature sensor circuit based on the second magnetic field received by induction element.

7. The system according to claim 6, wherein the second magnetic field includes a component of the first magnetic field that has a different frequency than the first magnetic field.

8. The system according to claim 1, wherein the capacitor of the temperature sensor circuit is in thermal contact with the susceptor element.

9. The system according to claim 1,
    wherein the resonant frequency of temperature sensor circuit changes based on a change in the capacitance value of capacitor, and
    wherein the capacitance value of capacitor is based on the temperature of the susceptor element.

10. The system according to claim 1, wherein the temperature sensor circuit is encapsulated within a structure.

11. The system according to claim 10, wherein the structure is a glass structure.

12. The system according to claim 1,
    further comprising a cartridge,
    wherein the susceptor element is located within the cartridge and the temperature sensor circuit is located within the cartridge.

13. The system according to claim 12,
    further comprising a vaporizer device,
    wherein the cartridge is removable from the vaporizer device.

14. The system according to claim 12, wherein the vaporizer device comprises the induction element.

15. The system according to claim 14,
    further comprising an RFID device electrically connected to the temperature sensor circuit,
    wherein the RFID device is located within the cartridge.

* * * * *